(12) United States Patent
Irving et al.

(10) Patent No.: US 8,545,194 B2
(45) Date of Patent: Oct. 1, 2013

(54) BATTERY OPERATED SOLAR CHARGED PUMP KIT UTILIZING AN INLINE SUBMERSIBLE PUMP

(75) Inventors: Michael Howard Irving, Haverhill, MA (US); Jeffrey Brian Schopperle, Wakefield, MA (US)

(73) Assignee: Xylem IP Holdings LLC, White Plains, NY (US)

( * ) Notice: Subject to any disclaimer, the term of this patent is extended or adjusted under 35 U.S.C. 154(b) by 282 days.

(21) Appl. No.: 12/965,383

(22) Filed: Dec. 10, 2010

(65) Prior Publication Data

US 2012/0148427 A1 Jun. 14, 2012

(51) Int. Cl.
*F04B 17/03* (2006.01)
*B60K 16/00* (2006.01)

(52) U.S. Cl.
USPC ............... 417/411; 417/423.3; 60/641.8

(58) Field of Classification Search
USPC ............ 417/411, 423.3, 423.7; 60/641.8, 60/641.11, 641.15
See application file for complete search history.

(56) References Cited

U.S. PATENT DOCUMENTS

| | | | |
|---|---|---|---|
| 4,086,034 A * | 4/1978 | Hokky | 417/369 |
| 4,303,833 A | 12/1981 | Eckel et al. | |
| 4,620,140 A | 10/1986 | Chonan | |
| 4,744,334 A * | 5/1988 | McAnally | 119/78 |
| 6,049,919 A * | 4/2000 | Roteman | 4/602 |
| 6,050,779 A * | 4/2000 | Nagao et al. | 417/28 |
| 6,189,811 B1 | 2/2001 | Rudy | |
| 6,612,815 B2 | 9/2003 | Pawellek et al. | |
| 6,641,002 B2 | 11/2003 | Gerenraich et al. | |
| 7,025,879 B1 | 4/2006 | Ticknor | |
| 7,121,433 B2 | 10/2006 | Nelson et al. | |
| 7,318,422 B2 | 1/2008 | Douyama et al. | |
| 7,484,671 B2 | 2/2009 | Wigglesworth et al. | |
| 2001/0030201 A1 | 10/2001 | Gerhardt | |
| 2007/0166178 A1 | 7/2007 | Moreland | |
| 2008/0286134 A1 | 11/2008 | Regalado et al. | |
| 2010/0206397 A1 | 8/2010 | Hewitt | |
| 2010/0303654 A1 * | 12/2010 | Petersen et al. | 417/423.7 |

FOREIGN PATENT DOCUMENTS

| | | |
|---|---|---|
| CN | 2795494 | 7/2006 |
| CN | 201057747 | 5/2008 |
| CN | 201099128 | 8/2008 |
| EP | 1447561 | 8/2004 |
| EP | 1719915 | 8/2006 |
| JP | 2027200 | 1/1990 |
| JP | 6063591 | 3/1994 |
| JP | 2009174129 | 8/2009 |

OTHER PUBLICATIONS

JP2009174129 English Language Abstract.

(Continued)

*Primary Examiner* — Charles Freay

(57) ABSTRACT

A rechargeable battery operated solar pump kit is provided including a solar panel to provide solar power via an electrical terminal, an inline submersible pump and a control box containing a pipe fitting, a rechargeable battery, an electrical fitting and an on/off switch. The inline submersible pump passes through a rain barrel, having a hose to discharge rainwater from the rain barrel, and a power cord, which is coupled to the rechargeable battery. The pipe fitting couples to the hose to receive the pumped rainwater and to a garden hose to provide the pumped rainwater. The electrical fitting couples the rechargeable battery to the electrical terminal of the solar panel and receives solar power to recharge the rechargeable battery. The on/off switch couples the rechargeable battery and the power cord to turn the inline submersible pump on/off to pump the rainwater.

9 Claims, 3 Drawing Sheets

(56) References Cited

OTHER PUBLICATIONS

CN201099128 English Language Abstract.
CN201057747 English Language Abstract.
JP6063591 English Language Abstract.
JP2027200 English Language Abstract.
CN2795494 English Language Abstract.

\* cited by examiner

Components of a system for a battery operated solar charged pump kit utilizing an inline submersible pump View from underside of the box

BATTERY OPERATED SOLAR CHARGED PUMP KIT UTILIZING AN INLINE SUBMERSIBLE PUMP

BACKGROUND OF THE INVENTION

1. Field of the Invention

The present invention relates to a system or apparatus for pumping rain water from a rain barrel or container; and more particularly, the present invention relates to a battery operated solar charged pump kit that may be configured to pump rainwater collected in the rain barrel or container during rainstorms using an inline submersible pump receiving battery stored solar power.

2. Brief Description of Related Art

Current known products on the market utilize a diaphragm pump in conjunction with a battery and solar panel and are assumed to be very pricey for the intended application (e.g. having a retail price of about +$700).

SUMMARY OF THE INVENTION

According to some embodiments, the present invention takes the form of a battery operated solar charged pump kit configured to be arranged in relation to a rain barrel or container, which may include, e.g. a 55 gallon rain barrel that has a top opening for pumping out rainwater collected during rainstorms. By way of example, the rain barrel or container may typically be arranged in relation to a gutter/leader arrangement installed on one's home, e.g. for collecting rainwater water channel from a gutter passing down from the roof via a leader. The rain barrel or container would be typically arranged underneath the leader that is raised a couple feet from the ground so as to provide rainwater onto the top of the rain barrel or container.

The solar pump kit comprises a solar panel, an inline submersible pump and a control box.

The solar panel may be configured to respond to solar energy, and to provide solar power via an electrical terminal.

The inline submersible pump may be configured with a suitable shape to pass through an opening of the rain barrel or container so as to be received and arranged inside the rain barrel or container. By way of example, the inline submersible pump may be shaped in a circular cylindrical shape having a diameter less than the diameter of a top opening so as to pass through the top opening in the rain barrel or container. The inline submersible pump is also configured with a fluid output port to couple the inline submersible pump to a hose, where the hose is configured with a length that is long enough to extend out of the top opening to discharge the rainwater from the rain barrel when the inline submersible pump is arranged on the bottom of the rain barrel or container and turned on so as to pump rainwater from the rain barrel or container. The inline submersible pump is also configured with a power cord to received electrical power to operate the inline submersible pump. In operation, the inline submersible pump according to the present invention is configured to provide enough pressure to run most low pressure sprinklers, to wash a car or water just about anything around one's home.

The control box may be configured with a housing to contain the following components: a pipe fitting, a rechargeable battery, an electrical fitting and an on/off switch on a circuit board that may or may not be configured to show the battery power level.

The pipe fitting is configured with one end to couple to the hose of the inline submersible pump in order to receive the rainwater being pumped from the rain barrel. The pipe fitting is also configured with another end having a garden hose pipe fitting to couple to a standard garden hose to provide the rainwater being pumped. By way of example, the pipe fitting may take the form of an angled pipe fitting having an L-shaped configuration, where the one end coupled to the hose of the inline submersible pump extends out the bottom of the control box in order to receive the rainwater being pumped from the rain barrel, e.g., when the control box is arranged on the top surface of the rain barrel, and where the other end with the garden hose pipe fitting extends out the side of the control box, e.g., to couple to the garden hose to provide the rainwater being pumped.

The rechargeable battery may be coupled to the power cord of the inline submersible pump in order to provide the electrical power to the inline submersible pump in order to pump the fluid. By way of example, the rechargeable battery may take the form of an NiMH rechargeable battery suitably adapted and capable of being recharged by a solar panel. With the solar panel and rechargeable battery, there is no need for an electrical outlet having AC power making the pump ready to go anywhere anytime.

The electrical fitting may be configured to couple the rechargeable battery to the electrical terminal of the solar panel and receive the solar power in order to recharge the rechargeable battery.

The on/off switch may be configured to couple the rechargeable battery and the power cord of the inline submersible pump, to response to an on/off user input, and to turn the inline submersible pump on/off in order to pump the rainwater.

The solar pump kit may be configured to enable rainwater to be pumped out of the rain barrel in locations that have no access to electrical AC power. For a typical household application, the present invention can eliminate the need for running a long extension cord in order to provide power for running such a pump.

The solar pump kit may also include one or more of the following features: the housing of the control box may have a bottom surface having an opening configured to receive the one end of the pipe fitting that couples to the hose of the inline submersible pump; the housing of the control box may have a side surface having an opening configured to receive the other end of the pipe fitting that couples to the garden hose; the housing may have a bottom surface with an opening configured to receive a grommet coupled to the electrical wire of the inline submersible pump so as to pass the electrical wire through and engage the bottom surface; the housing may have a side having a side opening configured to receive the electrical fitting that couples the rechargeable battery to the electrical terminal of the solar panel; the housing may have a bottom portion having mounting supports configured to arrange the control box control box on the top surface of the rain barrel or container in relation to the top opening of the rain barrel in order to pass the inline submersible pump, the hose and the power cord through the top opening and into the rain barrel, and configured to frictionally engage the top surface of the rain barrel so as to maintain the position of the control box in relation to the top opening; the solar panel may be a 12 volt solar panel; and/or the inline submersible pump may comprise a brushed motor that may be used 350 or more times during its expected lifetime.

One advantage of the a battery operated solar charged pump kit according to the present invention is that it utilizes a low cost, high volume submersible inline pump to draw the water out of the collection tank, which provides a product that is more robust (separating the battery from the pump) at a lower cost to the consumer (e.g. having an approximate retail price of about $99, which may result in a capital cost of less than 3.0 cents per use during its lifetime based on 350 or more use life expectancy).

Other advantages of the battery operated solar charged pump kit according to the present invention are that the pump may be installed using very little time, e.g. in minutes; it connects to most, if not all, standard garden hoses; it is easy to operated and install; the submersible inline pump fits most style rain barrels; and/or a fully charged battery pumps to 100 gallons of water.

Other advantages of the battery operated solar charged pump kit according to the present invention is that it is configured to enable rainwater to be pumped out of the rain barrel in locations that have no access to electrical AC power.

In effect, the present invention provides a solution to a long felt need in the industry and to the domestic homeowner by providing a substantially less expensive yet highly effective technique for being able to collect and pump rain water from a rain barrel deployed in places that are remote from electrical power sources.

BRIEF DESCRIPTION OF THE DRAWING

The drawing includes the following Figures, not drawn to scale.

DETAILED DESCRIPTION OF THE INVENTION

Figure 1:
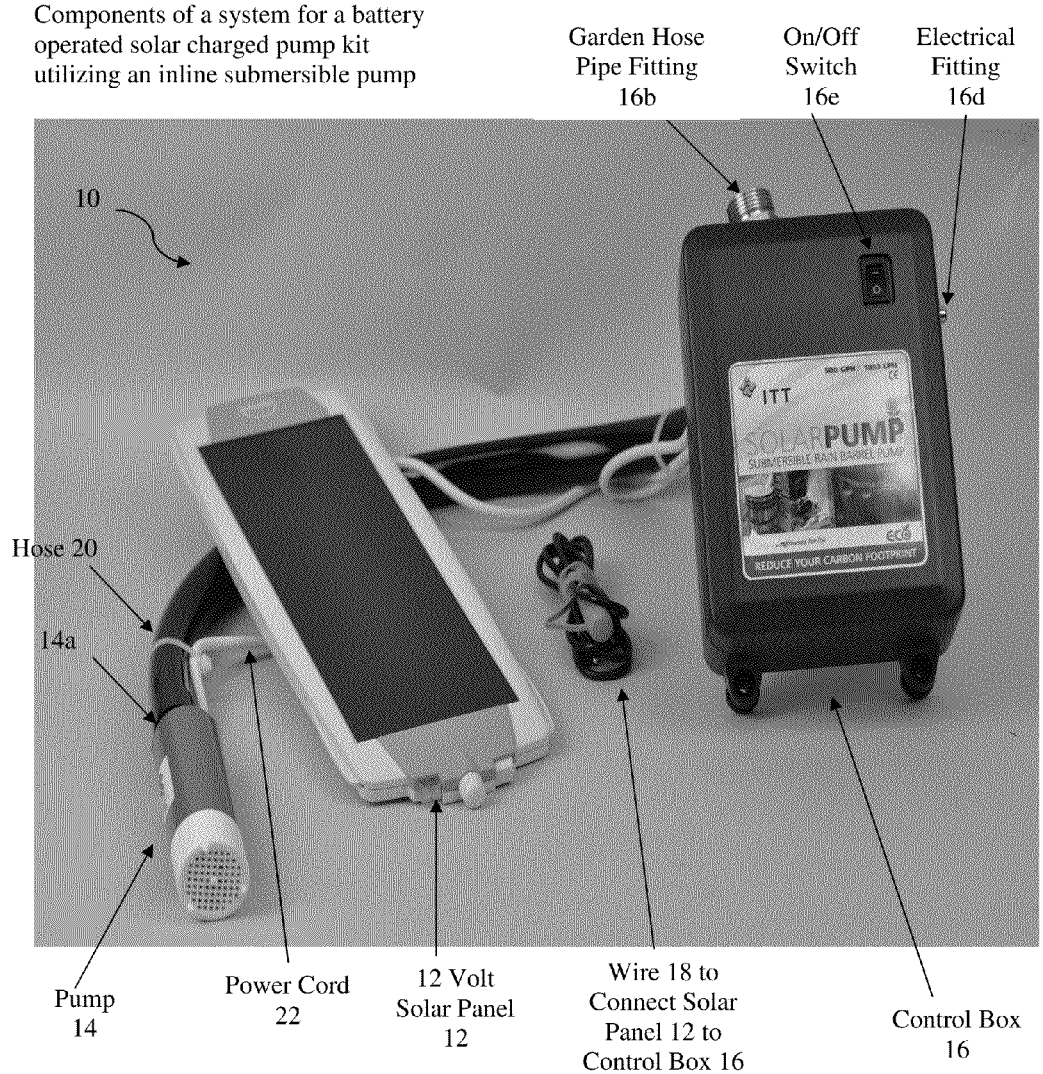
FIG. 1 is a diagram of components of a system for a battery operated solar charged pump kit utilizing an inline submersible pump according to some embodiments of the present invention.
Figure 4:
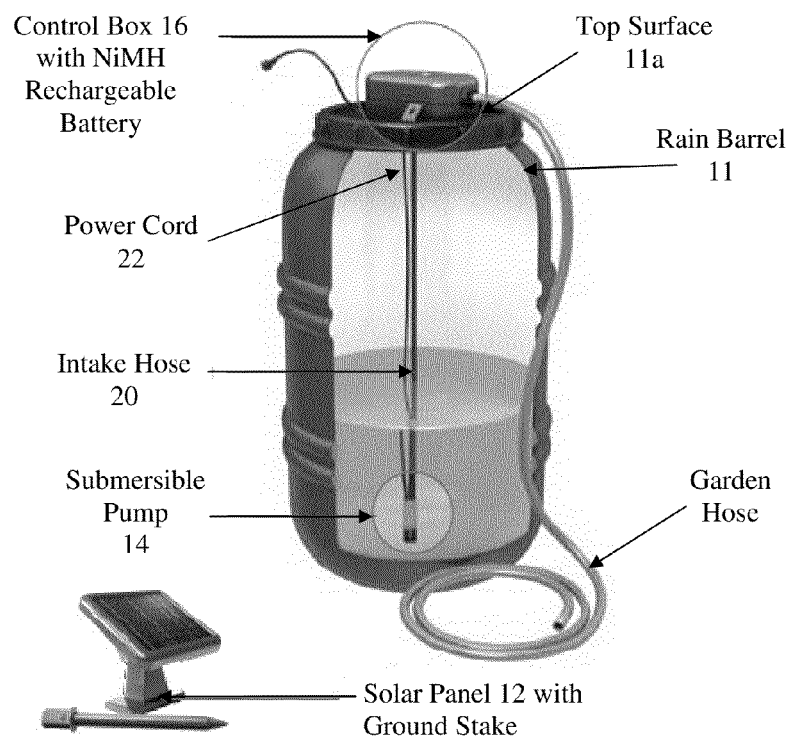
FIG. 4 shows a cut away view of a rain barrel or container having a control box arranged, e.g., on a top surface thereof, and an inline submersible pump connected to an intake hose and power cord extending into the rain barrel or container according to some embodiments of the present invention.

FIG. 1 shows components of a system for a battery operated solar charged pump kit generally indicated as 10 according to some embodiments of the present invention. The solar pump kit 10 may be configured to be arranged in relation to a rain barrel or container, e.g. a 55 gallon rain barrel 11 as shown in FIG. 4, e.g. on a top surface 11a as shown, that has a top opening (not shown) for pumping out rainwater collected during rainstorms.

The battery operated solar charged pump kit 10 may comprise three basic elements, i.e. a solar panel 12, an inline submersible pump 14 and a control box 16.

The solar panel 12 may be configured to respond to solar energy, and to provide solar power via an electrical terminal and a wire 18 that to connect the electrical terminal of the solar panel 12 to the control box 16. Solar panels like element 12 are known in the art, and the scope of the invention is not intended to be limited to any particular type or kind either now known or later developed in the future. By way of example, the solar panel 12 may provide power to an internal NiMH rechargeable batter, consistent with that set forth below. The solar pump kit 10 may be configured with the wire 18 being at least 15 or more feet long, allowing the solar panel 12 to be mounted anywhere. For example, the solar panel 12 may be configured to be mounted on the top of the rain barrel or container, a fence, a wall, or can be spiked to the ground.

The inline submersible pump 14 is configured with a shape to pass through an opening, e.g., the top opening of the rain barrel or container, so as to be extended into and arranged inside the rain barrel or container. The inline submersible pump 14 may also be configured with a fluid output port 14a to couple the inline submersible pump 14 to a hose 20, where the hose 20 is configured with a length that is long enough to extend out of the opening of the rain barrel or container to discharge the rainwater from the rain barrel or container when the inline submersible pump 14 is arranged at the bottom of the rain barrel or container and turned on so as to pump. The inline submersible pump 14 is also configured with a power cord 22 to received electrical power and having a corresponding length that is long enough to extend out of the opening of the rain barrel or container and couple to the control box 16, as described below and shown in FIG. 2.

Figure 2:
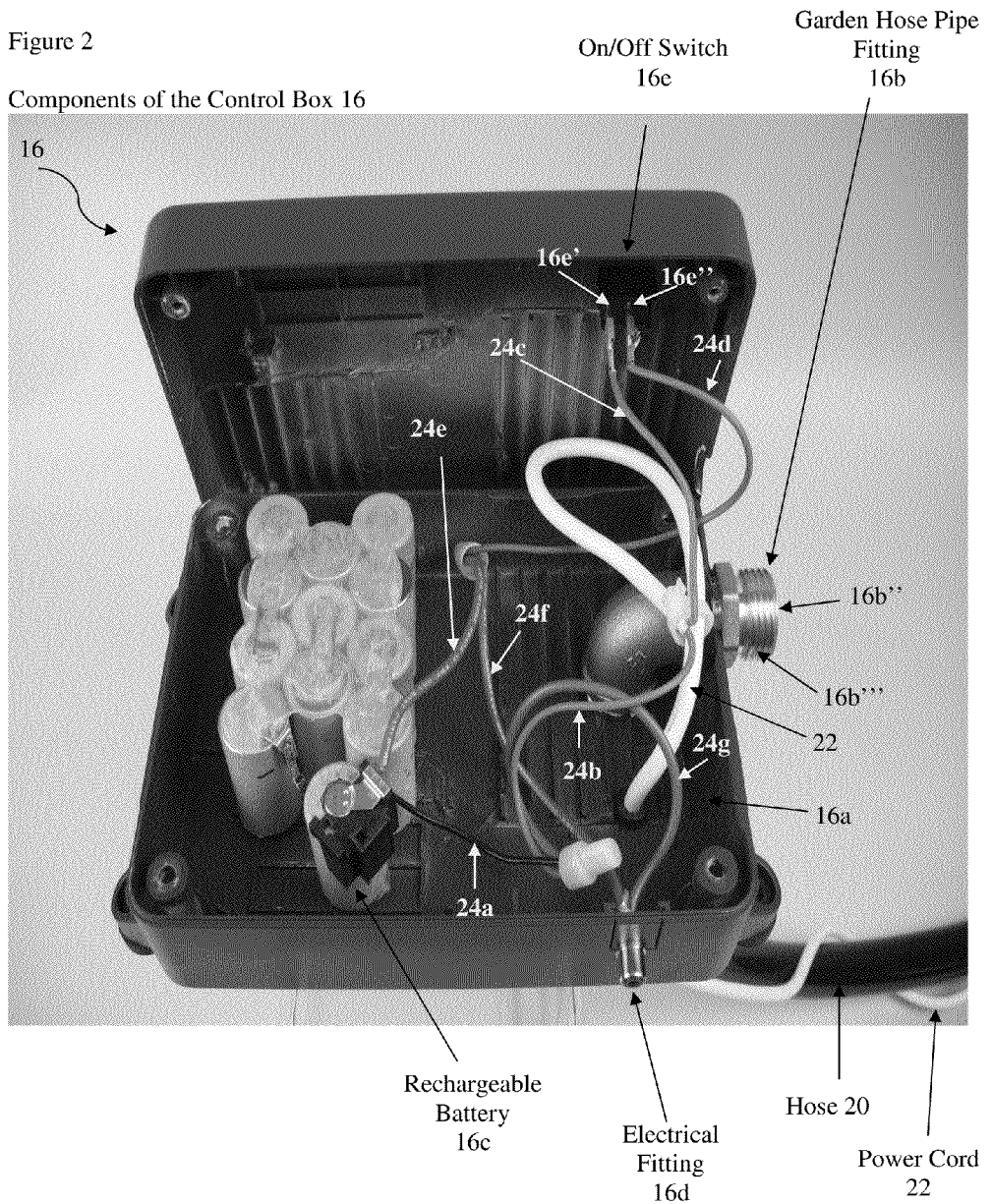
FIG. 2 is a diagram of components of a control box that forms part of the system shown in FIG. 1 according to some embodiments of the present invention.
Figure 3:
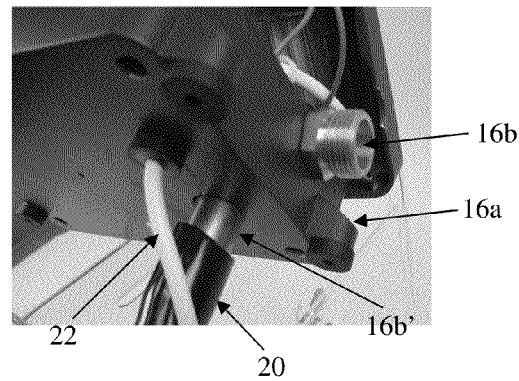
FIG. 3 is a view from an underside of the control bow shown in FIG. 2 according to some embodiments of the present invention.

By way of example, FIGS. 2 and 3 show the control box 16 according to the present invention, which is configured with a housing 16a to contain the following components: a pipe fitting 16b, a rechargeable battery 16c, an electrical fitting 16d and an on/off switch 16e. The pipe fitting 16b may be configured, by way of example, as an angled pipe fitting as shown having one end 16b' (see FIG. 3) extending though a bottom of the housing 16a of the control box 16 in order to couple to the hose 20 of the inline submersible pump 14 in order to receive the rainwater being pumped from the rain barrel or container. The angled pipe fitting 16b may also have another end 16" with a garden hose pipe fitting 16'" extending though a side of the housing 16a of the control box 16 in order to couple to a garden hose 30 (FIG. 4) to provide the rainwater being pumped.

The rechargeable battery 16c may be coupled via electrical leads 24a, 24b to the power cord 22 of the inline submersible pump 14 in order to provide the electrical power to the inline submersible pump 14 in order to pump the fluid. The power cord 22 of the inline submersible pump 14 may also be coupled via electrical leads 24c to one terminal 16e' of the on/off switch 16e. By way of example, the rechargeable battery may take the form of a solar rechargeable NiMH rechargeable battery for operation anytime in either daytime or nighttime.

The electrical fitting 16d may be configured to couple the rechargeable battery 16c to the electrical wire or terminal 18 to connect the solar panel 12 to the control box 16 and to receive the solar power in order to recharge the rechargeable battery 16c.

The on/off switch 16e may be configured with another terminal 16e" coupled to electrical leads 24e and 24f, where the electrical lead 24e may be configured to couple the terminal 16e" to the rechargeable battery 16c, and the electrical lead 24f may be configured to couple the terminal 16e" via electrical lead 24b to the power cord 22 of the inline submersible pump 14. In operation, when the on/off switch 16e is turn on/off, the inline submersible pump 14 will pump or not pump the rainwater from the rain barrel or container.

FIG. 4 shows the rain barrel or container 11 having the control box 16 arranged on the top surface 11a thereof and the inline submersible pump 14 connected to the intake hose 20 and the power cord 22 extending into the rain barrel or container 11 according to some embodiments of the present invention. However, the scope of the invention is not intended to be limited to the type or kind of rain barrel or container or the type or kind of fluids being pump out of the same, e.g. the scope of the invention is intended to include arranging the battery operated solar charged pump kit 10 in relation to other types or kind of containers configured to hold, contain or store other types or kinds of fluid, and is also intended to include other types or kind of containers with other physical dimensions besides, e.g., 55 gallons.

The battery operated solar charged pump kit 10 may also be configured with an instruction sheet for providing instructions for assembling the components of the system together, including the solar panel 12 and the electrical fitting 16d of the control box 16 using the wire 18, the hose 20 between the inline submersible pump 12 and the one end of the pipe fitting 16b, the garden hose 30 and the other end of the pipe fitting 16b, and the arrangement of the solar panel in relation to the rain barrel or container 11, especially to best receive the necessary sunlight to charge and recharge the rechargeable battery 16c, consistent with that disclosed herein.

POSSIBLE APPLICATIONS

Possible applications for the present invention include an implementation having some combination of the following features:
Water gardens;
Lawn sprinklers;
Washing car or boat; and/or
General water use.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the present invention is described by way of example in relation to a centrifugal pump, the scope of the invention is intended to include using the same in relation to other types or kinds of pumps either now known or later developed in the future.

Although the invention has been described and illustrated with respect to exemplary embodiments thereof, the foregoing and various other additions and omissions may be made therein and thereto without departing from the spirit and scope of the present invention.

What we claim is:

1. A solar pump kit, comprising:
   a solar panel configured to respond to solar energy, and to provide solar power via an electrical terminal;
   an inline submersible pump configured to be inserted through a top opening of a rain barrel or container so as to be arranged inside the rain barrel or container, configured with a fluid output port to couple the inline submersible pump to a first end of a first hose configured with a length that is long enough to extend from said fluid output port out of the top opening to discharge rainwater from the rain barrel or container when the inline submersible pump is arranged in the rain barrel or container, and configured with a power cord to receive electrical power; and
   a control box configured with a housing to contain the following components:
   i) a pipe fitting having one end to couple the control box to a second end of the first hose coupled to the inline submersible pump in order to receive the rainwater pumped from the rain barrel or container, the pipe fitting also having another end with a hose pipe fitting to couple the control box to a second hose to provide the rainwater being pumped;
   ii) a rechargeable battery coupled to the power cord of the inline submersible pump in order to provide the electrical power to the inline submersible pump in order to pump the fluid;
   iii) an electrical fitting configured to couple the rechargeable battery to the electrical terminal of the solar panel and receive the solar power in order to recharge the rechargeable battery; and
   iv) an on/off switch configured to couple the rechargeable battery and the power cord of the inline submersible pump, to respond to an on/off user input and to turn the inline submersible pump on/off in order to pump the fluid,
   such that the solar pump kit is configured to enable rainwater to be pumped out of the rain barrel or container in locations that have no access to electrical AC power.

2. A solar pump kit according to claim 1, wherein the housing has a bottom surface having an opening configured to receive the one end of the pipe fitting configured to couple to said second end of said first hose.

3. A solar pump kit according to claim 1, wherein the housing has a side surface having an opening configured to receive the another end of the pipe fitting configured to couple to said second hose.

4. A solar pump kit according to claim 1, wherein the housing has a bottom surface with an opening configured to receive a grommet coupled to the power cord of the inline submersible pump so as to pass the power cord through and engage the bottom surface.

5. A solar pump kit according to claim 1, wherein the housing has a side having a side opening configured to receive the electrical fitting configured to couple the rechargeable battery to the electrical terminal of the solar panel.

6. A solar pump kit according to claim 1, wherein the housing has a bottom surface having mounting supports configured to arrange the control box on a top surface of the rain barrel or container in relation to the top opening of the rain barrel or container in order to pass the inline submersible pump, the first hose and the power cord through the top opening and into the rain barrel or container, and configured to frictionally engage the top surface of the rain barrel or container so as to maintain the position of the control box in relation to the top opening.

7. A solar pump kit according to claim 1, wherein the solar panel is a 12 volt solar panel.

8. A solar pump kit according to claim 1, wherein the inline submersible pump comprises a brushed motor capable of 350 or more usages.

9. A solar pump kit according to claim 1, further comprising:
   an instruction sheet for providing instructions for assembling the components of the system together, including the solar panel and the electrical fitting of the control box, the first hose between the inline submersible pump and the one end of the pipe fitting, the second hose and the other end of the pipe fitting, and the arrangement of the solar panel in relation to the rain barrel or container, especially to best receive the necessary sunlight to charge and recharge the rechargeable battery.

* * * * *